United States Patent
Koga et al.

(10) Patent No.: US 6,627,850 B1
(45) Date of Patent: Sep. 30, 2003

(54) CONSUMABLE ELECTRODE TYPE ARC WELDING METHOD AND DEVICE THEREFOR

(75) Inventors: Yasuhiro Koga, Fukuoka (JP); Shinji Okumura, Fukuoka (JP); Takahide Hirayama, Fukuoka (JP); Satoru Nio, Fukuoka (JP); Haruki Nakashima, Fukuoka (JP); Tsuneo Mita, Kanagawa (JP)

(73) Assignees: Kabushiki Kaisha Yaskawa Denki, Fukuoka (JP); Hitachi Via Mechanics, Ltd., Kanagawa (JP)

( * ) Notice: Subject to any disclaimer, the term of this patent is extended or adjusted under 35 U.S.C. 154(b) by 0 days.

(21) Appl. No.: 09/936,269

(22) PCT Filed: Mar. 17, 2000

(86) PCT No.: PCT/JP00/01690
§ 371 (c)(1),
(2), (4) Date: Oct. 10, 2001

(87) PCT Pub. No.: WO00/54924
PCT Pub. Date: Sep. 21, 2000

(30) Foreign Application Priority Data

Mar. 18, 1999 (JP) .............................................. 11/74484

(51) Int. Cl.[7] .................................................. B23K 9/12
(52) U.S. Cl. .............................. 219/137.71; 219/137 PS
(58) Field of Search ........................ 219/137.71, 130.51, 219/137 PS, 130.7

(56) References Cited

U.S. PATENT DOCUMENTS

| | | | | |
|---|---|---|---|---|
| 3,339,057 A | * | 8/1967 | Bernard et al. .......... | 219/137.7 |
| 3,581,053 A | * | 5/1971 | Manz ..................... | 219/130.51 |
| 3,731,049 A | * | 5/1973 | Kiyohara et al. ....... | 219/137.71 |
| 4,000,374 A | * | 12/1976 | Keyser ................... | 219/137.71 |
| 4,518,844 A | | 5/1985 | Needham | |
| 4,529,864 A | * | 7/1985 | Bennett .................. | 219/137.71 |

FOREIGN PATENT DOCUMENTS

| | | | |
|---|---|---|---|
| EP | 0 119 052 | | 9/1984 |
| JP | 58-212872 | | 12/1983 |
| JP | 1-138063 | * | 5/1989 |
| JP | 8-229682 | | 9/1996 |
| JP | 9-085439 | | 3/1997 |
| JP | 10-175067 | * | 6/1998 |

OTHER PUBLICATIONS

Voropai et al, "Electromagnetic Mechanisms for the Pulsed Feed of Welding Wire", Avt. Svarka, 1980, No. I, pp46–49.*

* cited by examiner

Primary Examiner—Clifford C. Shaw
(74) Attorney, Agent, or Firm—Jordan and Hamburg LLP

(57) ABSTRACT

The welding method according to the present invention is adapted to carry out a welding operation by feeding a welding wire to a material to be welded, and generating an arc between the material to be welded and welding wire, in which the welding is done with the welding wire feeding speed increased and reduced during the welding operation, the welding wire feeding speed being reduced after the occurrence of short-circuiting is detected, the welding wire feeding speed being increased after the cancellation of the short-circuiting and the transfer of the welding operation to the formation of the arc are detected.

10 Claims, 3 Drawing Sheets

CONSUMABLE ELECTRODE TYPE ARC WELDING METHOD AND DEVICE THEREFOR

TECHNICAL FIELD

This invention relates to a consumable electrode type arc welding apparatus.

BACKGROUND ART

In order to carry out a welding operation by a gas shielded arc welding method, a welding apparatus shown in FIG. 1 has heretofore been used. Referring to the drawing, a reference numeral 1 denotes a base metal, 2 a welding power source, 3 a welding torch, 4 a tip of the welding torch, 5 a welding wire, 6 a welding arc, 11 wire feed rollers, 10 a motor for driving the wire feed rollers, 9 a wire wound spool, 7 an arm to which the welding torch 3 is fixed of a simplified carriage (not shown), or an arm of a welding robot, and 8 a conduit cable for feeding the wire 5 to the welding torch 3.

In order to carry out a welding operation by such a welding apparatus; first, a suitable voltage is supplied from the welding power source 2. Consequently, a welding arc 6 occurs between a free end of the welding wire 5 and the base metal 1, and the welding wire 5 is melted to form a droplet 22 as shown in FIG. 2. During this time, the welding arc 6 can be generated stably between the base metal 1 and the free end of the welding wire 5 by feeding the welding wire 5 by rotating the wire feed rollers 11 having the motor 10 as a driving power source therefor, by an amount sufficient enough to cause the droplet 22 to be transferred to the base metal 1.

Thus, in the welding operation which has heretofore been carried out, a feed speed of the welding wire supplied from the tip 4 to a weld zone is set so that the feed speed becomes constant at all times during the welding operation. For example, when a solid wire of 1.2 mm in diameter is used as the welding wire 5 with a welding current supplied at 200~300 ampere and with a carbon dioxide gas as a shielding gas supplied at 25 liters/min., the feed speed of the welding wire 5 is set to a constant level between 5~12 m/min.

On the other hand, the condition observed of the droplet 22 formed at the free end of the welding wire 5 and transferred to the base metal 1 with, for example, a carbon dioxide gas used as a shielding gas is as shown in FIG. 2. Namely, the droplet 22 starts being formed on a stage shown in FIG. 2A, and grows with the lapse of time on stages shown in FIG. 2B and FIG. 2C in order.

As is understood from FIG. 2, in a stage in which the droplet 22 starts being formed and grows, the droplet 22 is lifted up by an arc force since the arc occurs on a lower surface of the droplet 22. Therefore, the droplet 22 cannot be transferred easily to the base metal 1, i.e., the droplet 22 grows until it turns into the condition shown in FIG. 2C. The droplet 22 is transferred in an enlarged state to the base metal 1 as if it flew thereto as shown in FIG. 2D. When the enlarged droplet 22 thus transferred is taken in a molten pool in the base metal 1, it turns into a molten metal to contribute to the welding but, when the enlarged droplet 22 falls in a position other than the molten pool, it turns into a spatter, which does not contribute to the welding.

Thus, the related art gas shielded arc welding using a carbon dioxide gas as a shielding gas has the following inconveniences.

(1) Since a droplet 22 transferred from the free end of a welding wire 5 to the base metal 1 grows large, the droplet 22 is transferred to a position other than a molten pool to turn into a large-sized spatter in some cases.

(2) Since spatters occurring grow large, much time is needed to carry out an operation for removing the spatters deposited on the base metal 1. Moreover, an efficiency of deposition of droplets from a welding wire 5 to a weld zone lowers to cause a welding efficiency to decrease.

In order to eliminate these inconveniences, the following measures are employed in the methods disclosed in Japanese Patent Laid-Open No. 229682/1996 and Japanese Patent Laid-Open No. 85439/1997.

Japanese Patent Laid-Open No. 229682/1996 proposes welding method and apparatus rarely encountering the occurrence of a spatter, and having a high welding efficiency, which include varying the length of a passage for a welding wire in a welding torch by swinging a wire feed nozzle, which is provided in an inner portion of the welding torch, by an electromagnetic effect; and transferring a droplet, which occurs at a free end of the welding wire, to a base metal in a short-circuiting manner by changing a feed speed of the welding wire, which is sent out from a tip of the welding torch to a weld zone, from a predetermined level to a high level momentarily in a suitable cycle.

Japanese Patent Laid-Open No. 85439/1997 proposes welding method and apparatus rarely encountering the occurrence of spatters, which enable a droplet constituting a primary factor of the occurrence of a spatter to be transferred to a base metal regularly and reliably by varying a welding pule current synchronously with the changing of a feed speed of a welding wire, which is proposed in Japanese Patent Laid-Open No. 229682/1966, from a predetermined level to a high level momentarily in a suitable cycle.

FIG. 3 shows the construction of a welding torch of the apparatus disclosed in Japanese Patent Laid-Open No. 85439/1997. Referring to the drawings, a reference numeral 3 denotes a welding torch, 4 a tip, 5 a welding wire, 8 a conduit cable, 12 a base portion of the torch, 13 a shielding gas supply pipe, 14 a shielding gas injection port, 15 a spring, 16 a wire feeding nozzle, 17 a tip fixing member, 18A and 18B magnetic cores, 19A and 19B electromagnetic coils, 20A, 20B DC voltage generators, and 21 a voltage generator regulating unit.

As shown in FIG. 3, in the apparatus disclosed in Japanese Patent Laid-Open No. 85439/1997, the welding torch 3 has a special construction, and the voltage generator regulating unit 21 for swinging the wire feed nozzle 16, which is provided in an inner portion of the welding torch 3, by an electromagnetic effect is required. This apparatus was complicated and expensive. Moreover, a feed speed of the welding wire 5 can be varied only in a limited range corresponding to the swinging of the wire feed nozzle 16 in the inner portion of the welding torch 3.

In the related art welding apparatus, the techniques for suppressing the occurrence of a large sized spatter in a region (not higher than substantially 1.5 m/min) of a low welding speed are attained. However, in a welding operation carried out at a welding speed of not lower than substantially 2 m/min, a welding current is as high as 300A~400A, so that a wire melting speed becomes high to cause a large quantity of droplets to be formed, and an arc to become unstable.

DISCLOSURE OF INVENTION

The present invention has been made in view of the above-mentioned circumstances, and provides simple and inexpensive welding method and apparatus adapted to extremely reduce spatters occurring and scattering even during a welding operation carried out at a speed of not lower than substantially 2 m/min.

According to an aspect of the present invention, the consumable electrode type arc welding method has the steps of feeding a welding wire to a material to be welded, and carrying out a welding operation by generating an arc between the material to be welded and welding wire, the method including the steps, which are used during a welding operation, of reducing after the short-circuiting of the welding wire and material to be welded a wire feeding speed to a low level not higher than that of a wire feeding speed in a regular welding operation, and increasing the wire feeding speed to a level not lower than that of the wire feeding speed in a regular welding operation.

According to another aspect of the present invention, the consumable electrode type arc welding method has the step of carrying out a welding operation by using a consumable electrode type arc welding apparatus provided with a welding power source for canceling short-circuiting when short-circuiting occurs, by raising a short-circuiting current at a rate of increase of at least 500 A/ms by controlling a welding current and a welding voltage, a unit for feeding the welding wire to a material to be welded, a unit for giving the welding wire feeding unit in accordance with a signal from a short-circuiting/short-circuiting cancellation detector which is to be referred to below an instruction to feed the welding wire by reducing after the short-circuiting of the welding wire and material to be welded is detected after the occurrence of an arc a wire feeding speed to a low level not higher than that of a wire feeding speed in a regular welding operation, increasing after the cancellation of the short-circuiting the wire feeding speed to a level not lower than that of the wire feeding speed in a regular welding operation, and thereby setting equal to each other a shortage of an amount of the welding wire fed while the wire feeding speed is reduced and an excess of an amount of the welding wire fed while the wire feeding speed is increased, a welding condition setter, a welding speed setter, a unit for moving a welding torch in accordance with a welding speed, and a detector for detecting short-circuiting and the cancellation of the short-circuiting.

According to the present invention, a special structure is not needed in the welding apparatus used in the consumable electrode type arc welding, and the welding is done by reducing or increasing a welding wire feeding speed synchronously with the short-circuiting or the cancellation of the short-circuiting. Therefore, the present invention has the following effects, etc.

The welding apparatus is simple and inexpensive.

The cancellation of the short-circuiting can be carried out speedily, and spatters occurring and scattering during a welding operation decrease extremely.

The welding operation is transferred from the short-circuiting to the formation of an arc speedily, so that the breakage of an arc can be prevented.

An excellent bead can be obtained.

A stable arcing condition is obtained even at a welding speed of not lower than 2 m/min.

BEST MODE FOR CARRYING OUT THE INVENTION

Figure 1:
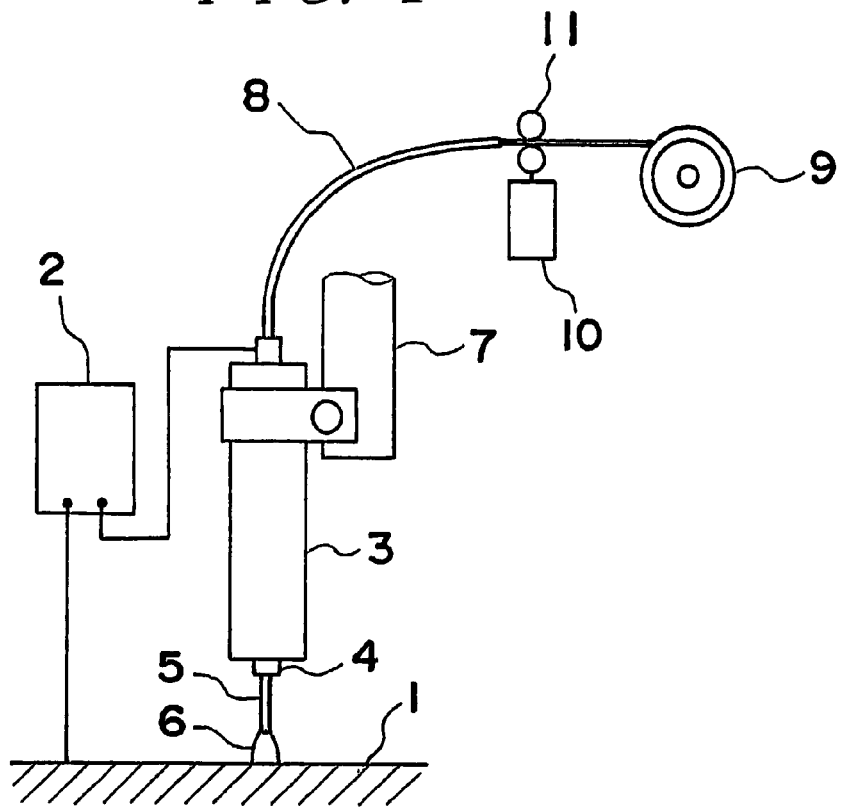
FIG. 1 is a schematic diagram of a related art gas shielded gas welding apparatus.
Figure 2:
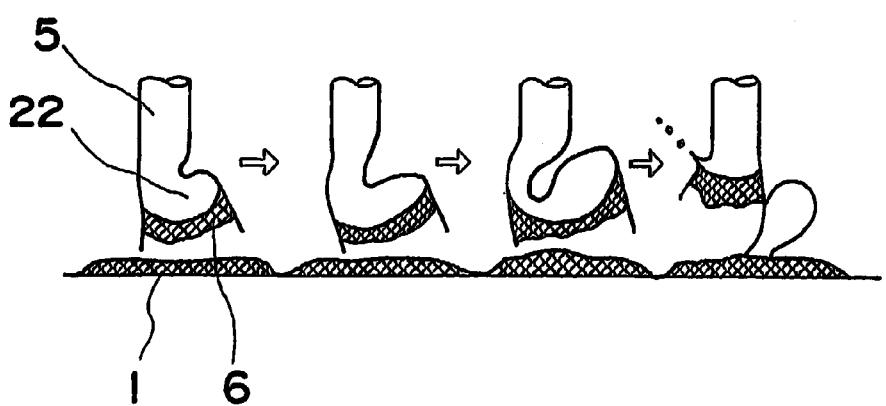
FIG. 2 illustrates the condition of transfer of a droplet in the related art gas shielded gas welding.
Figure 3:
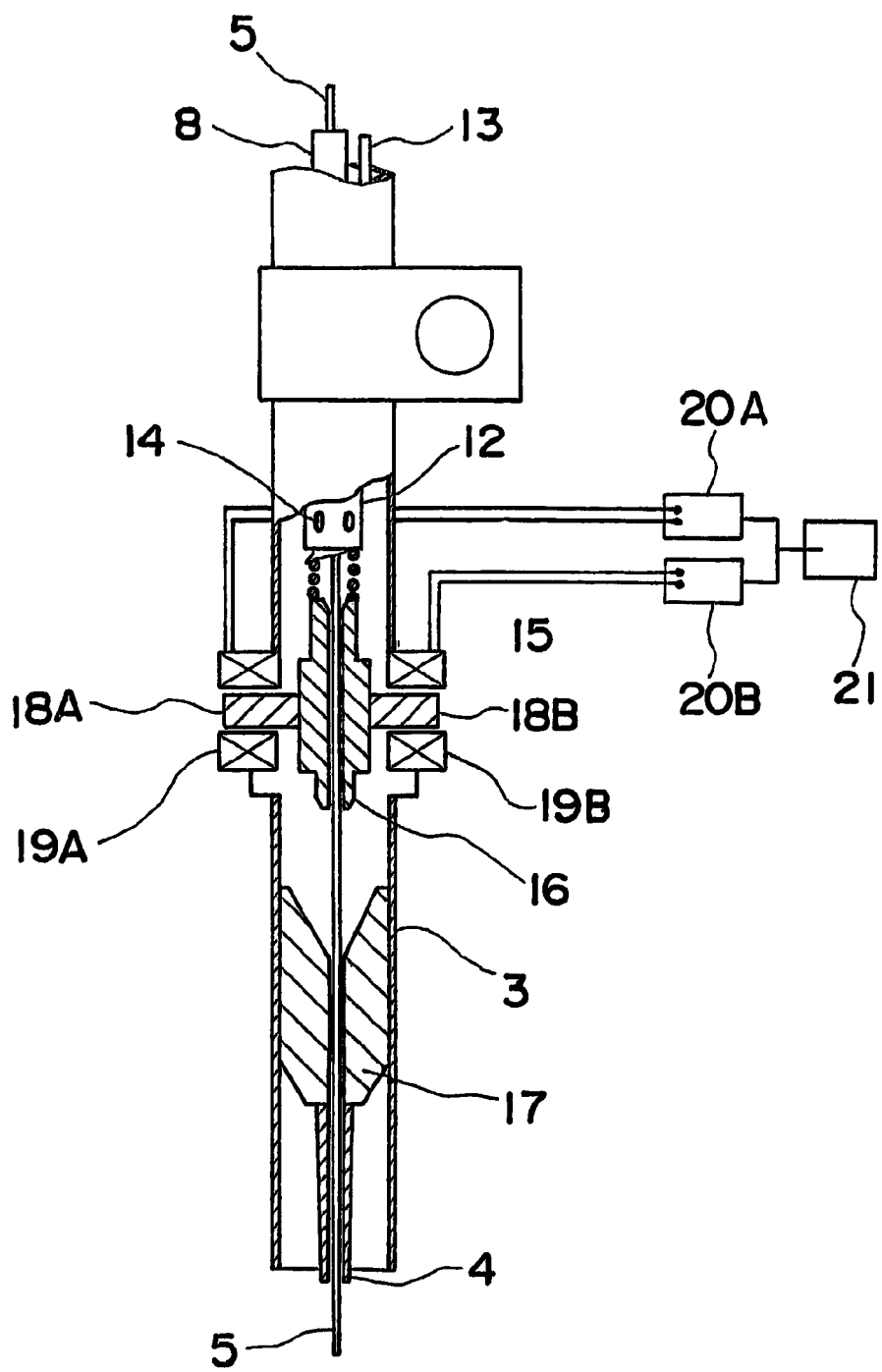
FIG. 3 is a partially cutaway front view showing the construction of the welding torch disclosed in Japanese Patent Laid-Open No. 229682/1996 and Japanese Patent Laid-Open No. 85439/1997.
Figure 4:
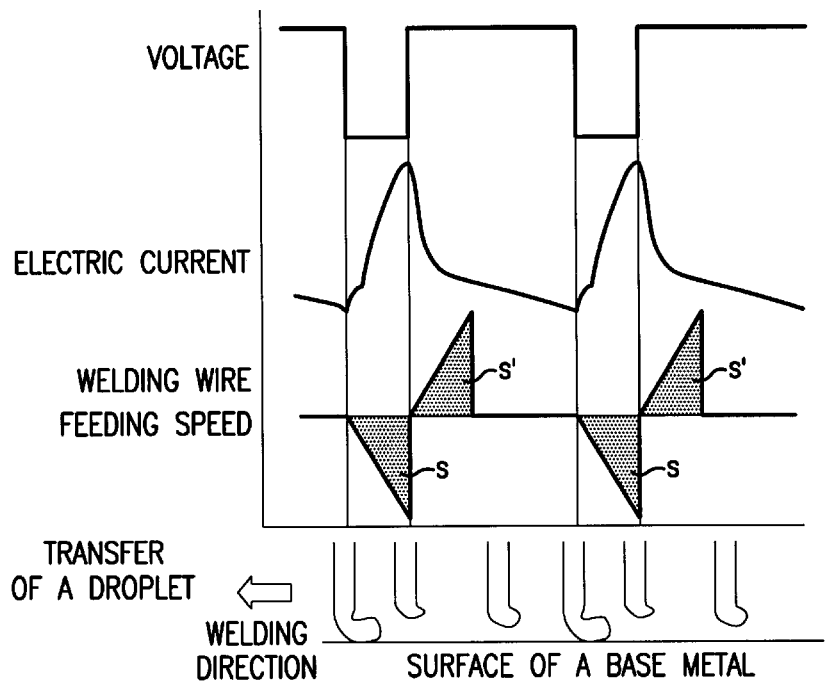
FIG. 4 is a diagram showing the relation among the transfer of a droplet, a welding voltage, a welding current and a welding wire feeding speed in the present invention.

As seen in FIG. 4, when short-circuiting occurring with a voltage decreasing to a level lower than a predetermined level is detected, a welding current increases after the lapse of predetermined delay time so as to cancel the short-circuiting. When a welding wire feeding speed is reduced synchronously with the detection of the short-circuiting, a flow or the surface tension of a molten metal in a molten pool work effectively for the removal of a droplet from a free end of the welding wire, and promote the cancellation of the short-circuiting. After the short-circuiting is cancelled, the welding wire feeding speed is increased to prevent the breakage of an arc ascribed to the removal of the droplet from the welding wire, and carry out speedily the transferring of the welding operation to the formation of the arc and the forming of a droplet. When an amount S of a decrease of the welding wire fed, due to the decreasing of the welding wire feeding speed and an amount S' of an increase of the welding wire fed, due to the increasing of the welding wire feeding speed are then set equal to each other, an amount of deposition becomes substantially constant, and an excellent bead is obtained. Since the short-circuiting is cancelled speedily owing to not only the controlling of the welding current done by the welding power source 23 but also the controlling of the welding wire feeding speed, the occurrence of spatters is also suppressed.

Figure 5:
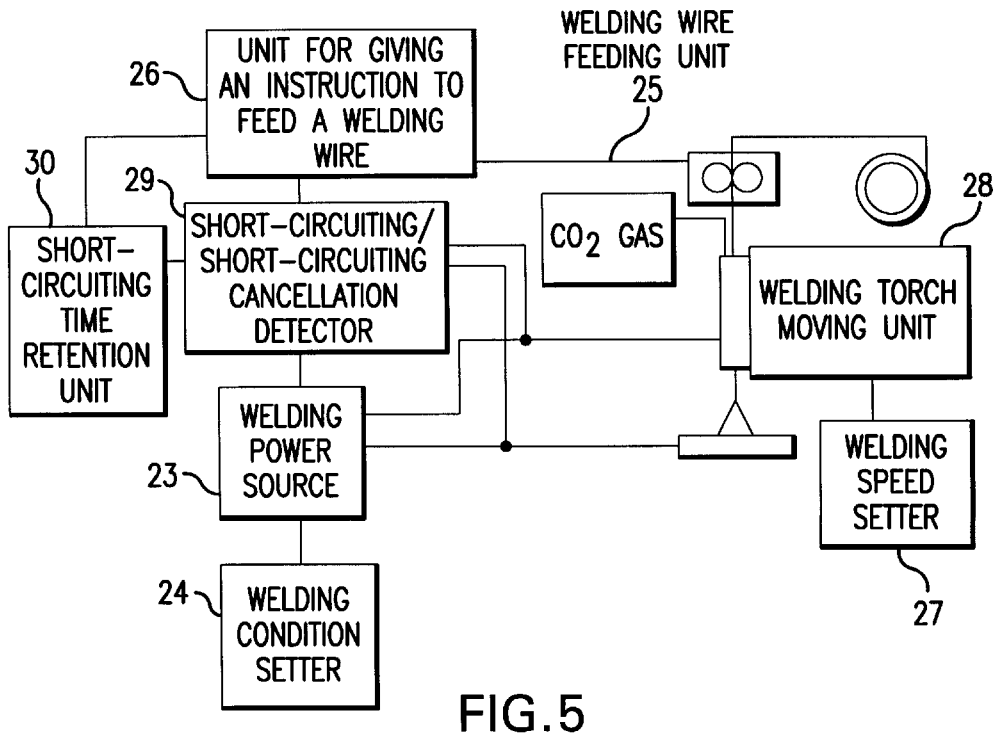
FIG. 5 is a block diagram showing the construction of the welding apparatus according to the present invention.

FIG. 5 is a block diagram showing the construction of the welding apparatus. Referring to the drawing, a reference numeral 23 denotes a welding power source, 24 a welding condition setter, 25 a welding wire feeding unit, 26 a unit for giving an instruction to feed the welding wire, 27 a welding speed setter, 28 a welding torch moving unit, 29 a short-circuiting/short-circuiting cancellation detector, and 30 a short-circuiting time retention unit.

The unit 26 gives an instruction to feed the welding wire to the welding wire feeding unit 25. The welding wire feeding unit 25 sends the welding wire to the metal base on the basis of the welding wire feeding instruction. The welding condition setter 24 sets the conditions for carrying out a desired welding operation. The welding speed setter 27 sets a welding speed, for example, substantially 2 m/min for carrying out a desired welding operation, and the welding torch moving unit 28 moves the welding torch in accordance with the set welding speed a welding operation being thereby carried out, When short-circuiting occurs during a welding operation, the fact is detected on the basis of information on a welding voltage, etc. by the short-circuiting/short-circuiting cancellation detector 29. When the short-circuiting is detected, the short-circuiting/short-circuiting cancellation detector 29 sends a short-circuiting detected signal to the welding power source 23, unit 26 for giving an instruction to set a welding wire feeding speed and short-circuiting time retention unit 30. The short-circuiting time retention unit 30 starts measuring the short-circuiting time, and the welding power source 23 increases the welding current after the lapse of delay time determined in advance, so as to cancel the short-circuiting. During a high-speed welding operation of a welding speed of not lower than 2 m/min, a rate of increasing the welding current is set to 500 A/msec which is at least 3~10 times as high as that in a regular welding operation. Thus, the time consumed in canceling the short-circuiting is reduced, and the short-circuiting is canceled without causing a droplet to be enlarged. Therefore, the occurrence of large-sized spatters is prevented, and the arc is stabilized. The unit 26 for giving an instruction to set a welding wire feeding speed sends an instruction to reduce the welding wire feeding speed to the welding wire feeding unit 25 in accordance with a preset deceleration rate, and the welding wire feeding unit 25 feeds the welding wire to the base metal in accordance with the instruction to reduce the welding wire feeding speed. When the short-circuiting is canceled, the short-circuiting/short-circuiting cancellation detector 29 detects the cancellation of short-circuiting on the basis of information on a welding voltage, etc., and sends a short-circuiting cancellation detected signal to the welding power source 23, unit 26 for giving an instruction to set a welding wire feeding speed and short-circuiting time retention unit 30. The short-circuiting time retention unit 30 finishes measuring the short-circuiting time, retains the short-circuiting time and sends the short-circuiting time to the unit 26 for giving an instruction to set a welding wire feeding speed. When the short-circuiting time is thus measured in the short-circuiting time retention unit 30, the amount S of a decrease of the welding wire fed and an amount S' of an increase of the welding wire fed can be set equal to each other.

When the welding power source 23 stops supplying a voltage corresponding to the short-circuiting time to cause an arc to occur, the welding current decreases, and the unit 26 for giving an instruction to set a welding wire feeding speed sends an instruction to increase the welding wire feeding speed, to the welding wire feeding unit 25 in accordance with a predetermined acceleration rate and the short-circuiting time sent thereto. The welding wire feeding unit 25 sends the welding wire to the base metal in accordance with the speed increasing instruction.

When the welding wire feeding motor and welding torch are connected together by, for example, a conduit, the welding wire meanders in an inner portion of the conduit, and responses to be made when the welding wire feeding speed is increased and decreased delay in some cases. Therefore, when the welding wire feeding motor is provided on the torch portion with a distance between the motor and arc reduced, responses to instructions to increase and decrease the wire feeding speed can be made earlier.

As described above, the welding apparatus according to the present invention is capable of carrying out a consumable electrode type arc welding operation, which is synchronous with the occurrence of short-circuiting, simply and inexpensively without requiring a special structure, and suppressing the occurrence of spatters even in a high-speed welding operation of 2 m/min.

INDUSTRIAL APPLICABILITY

The present invention can be utilized in the field of the arc welding.

What is claimed is:

1. A consumable electrode arc welding method comprising:

feeding a wire to a material for welding;

generating an arc between the material for welding and the welding wire;

detecting a short circuit between the wire and the material for welding;

decelerating a speed of feeding the wire upon detection of the short circuit between the wire and the material for welding;

detecting a cancellation of the short circuit between the wire and the material for welding; and ceasing deceleration and commencing acceleration of the speed of feeding of the wire upon detection of cancellation of the short circuit.

2. The consumable electrode arc welding method according to claim 1, wherein the decrease in speed of feeding the welding wire upon detection of a short circuit between the wire and the material for welding resulting from the deceleration of the speed of feeding of the wire and the increase in speed upon detection of the cancellation of the short circuit between the wire and the material for welding resulting from the acceleration of the speed of feeding of the wire are equal to each other.

3. A consumable type electrode type arc welding apparatus comprising:

a unit for feeding a wire to a material for welding;

a unit for generating an arc between the material for welding and the welding wire;

a unit for detecting a short circuit between the wire and the material for welding;

a unit for decelerating a speed of feeding the wire upon detection of the short circuit between the wire and the material for welding;

a unit for detecting a cancellation of the short circuit between the wire and the material for welding; and a unit for ceasing deceleration and commencing acceleration of the speed of feeding of the wire upon detection of cancellation of the short circuit.

4. The consumable type electrode type arc welding apparatus according to claim 3, wherein the unit for decelerating the speed of feeding of the wire and the unit for ceasing deceleration and commencing acceleration of the speed of feeding of the wire are set so that a shortage of the wire resulting from a decrease in speed of feeding of the wire and an increase of the wire resulting from an increase in speed of feeding of the wire are equal to each other.

5. The consumable type electrode type arc welding apparatus according to claim 4, further comprising:

a welding condition setter;

a welding speed setter; and a unit for moving the unit for generating an arc between the material for welding and the welding wire in accordance with the speed of feeding of the wire.

6. The consumable type electrode type arc welding apparatus according to claim 5, further comprising the unit for feeding the wire to the material for welding including a feed motor being fixed to a torch portion and adapted to feed the wire from the torch portion the material for welding.

7. The consumable type electrode type arc welding apparatus according to claim 4, further comprising the unit for feeding the wire to the material for welding including a feed motor being fixed to a torch portion and adapted to feed the wire from the torch portion the material for welding.

8. The consumable type electrode type arc welding appartus according to claim 3, further comprising:
   a welding condition setter;
   a welding speed setter; and
   a unit for moving the unit for generating an arc between the material for welding and the welding wire in accordance with the speed of feeding of the wire.

9. The consumable type electrode type arc welding apparatus according to claim 8, further comprising the unit for feeding the wire to the material for welding including a feed motor being fixed to a torch portion and adapted to feed the wire from the torch portion the material for welding.

10. The consumable type electrode type arc welding apparatus according to claim 3, further comprising the unit for feeding the wire to the material for welding including a feed motor being fixed to a torch portion and adapted to feed the wire from the torch portion the material for welding.

* * * * *